US011875736B2

(12) United States Patent
Sohn et al.

(10) Patent No.: US 11,875,736 B2
(45) Date of Patent: Jan. 16, 2024

(54) DRIVING CONTROLLER, DISPLAY DEVICE INCLUDING THE SAME AND OPERATING METHOD OF DISPLAY DEVICE

(71) Applicant: Samsung Display Co., Ltd., Yongin-si (KR)

(72) Inventors: Youngsoo Sohn, Yongin-si (KR); Jong-Woong Park, Seongnam-si (KR); SeokJeong Song, Yongin-si (KR); Jiyeon Baik, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/986,115

(22) Filed: Nov. 14, 2022

(65) Prior Publication Data

US 2023/0282154 A1 Sep. 7, 2023

(30) Foreign Application Priority Data

Mar. 4, 2022 (KR) ........................ 10-2022-0028403

(51) Int. Cl.
*G09G 3/32* (2016.01)

(52) U.S. Cl.
CPC ....... *G09G 3/32* (2013.01); *G09G 2300/0842* (2013.01); *G09G 2310/08* (2013.01); *G09G 2320/0238* (2013.01); *G09G 2320/043* (2013.01); *G09G 2320/066* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 10,943,531 B1 * | 3/2021 | Chen | .................... | G09G 3/3208 |
| 2016/0133175 A1 * | 5/2016 | Lee | ...................... | G09G 3/3208 345/694 |
| 2016/0343301 A1 * | 11/2016 | Choi | .................... | G09G 3/3208 |
| 2017/0162109 A1 * | 6/2017 | An | ........................ | G09G 3/3208 |
| 2021/0192998 A1 * | 6/2021 | Song | .................... | G09G 3/3233 |
| 2021/0201819 A1 * | 7/2021 | Choi | .................... | G09G 3/3233 |
| 2022/0036823 A1 * | 2/2022 | Iwauchi | ............... | G09G 3/3233 |

(Continued)

FOREIGN PATENT DOCUMENTS

| | | |
|---|---|---|
| KR | 1020210085232 A | 7/2021 |
| KR | 1020220046464 A | 4/2022 |

*Primary Examiner* — Dorothy Harris
(74) *Attorney, Agent, or Firm* — CANTOR COLBURN LLP

(57) ABSTRACT

A driving controller includes a compensator that calculates a compensation value based on first accumulated stress, and outputs an output image signal by compensating for the input image signal with the compensation value, a stress converter that converts the output image signal into current stress in response to an enable signal, an accumulation stress calculator that outputs second accumulated stress by adding the first accumulated stress and the current stress in response to the enable signal, a memory that stores the second accumulated stress and provides the first accumulated stress to the compensator and the accumulation stress calculator, and an operating time calculator that receives a current operating frequency and outputs the enable signal of an active level based on the current operating frequency.

22 Claims, 11 Drawing Sheets

(56) References Cited

U.S. PATENT DOCUMENTS

| | | | | |
|---|---|---|---|---|
| 2022/0044619 | A1* | 2/2022 | Sohn .................... | G09G 3/2092 |
| 2022/0068195 | A1* | 3/2022 | Yun .......................... | G09G 3/32 |
| 2022/0108667 | A1 | 4/2022 | Park et al. | |

* cited by examiner

DRIVING CONTROLLER, DISPLAY DEVICE INCLUDING THE SAME AND OPERATING METHOD OF DISPLAY DEVICE

This application claims priority to Korean Patent Application No. 10-2022-0028403, filed on Mar. 4, 2022, and all the benefits accruing therefrom under 35 U.S.C. § 119, the content of which in its entirety is herein incorporated by reference.

BACKGROUND

1. Field

Embodiments of the disclosure described herein relate to a display device.

2. Description of the Related Art

Electronic devices, which provide images to a user, such as a smart phone, a digital camera, a notebook computer, a navigation system, a monitor, and a smart television include a display device for displaying the images. The display device generates an image and provides the user with the generated image through a display screen.

The display device includes a plurality of pixels and driving circuits for controlling the plurality of pixels. Each of the plurality of pixels includes a light-emitting element and a pixel circuit for controlling the light-emitting element. The pixel circuit may include a plurality of transistors organically connected to one another.

The display device may apply a data signal to a display panel. When a current corresponding to the data signal is supplied to the light-emitting element, the display device may display a predetermined image.

For the purpose of improving quality of a display image, the display device is being proposed to change an operating frequency as desired without restricting the operating frequency to a fixed value.

SUMMARY

Embodiments of the disclosure provide a driving controller capable of stably operating in response to a change in the frequency of an input image signal, and a display device including the same.

Embodiments of the disclosure provide an operating method of the display device capable of stably operating in response to a change in the frequency of an input image signal.

In an embodiment of the disclosure, a driving controller includes a compensator that receives an input image signal, calculates a compensation value based on first accumulated stress, and outputs an output image signal by compensating for the input image signal with the compensation value, a stress converter that converts the output image signal into current stress in response to an enable signal, an accumulation stress calculator that outputs second accumulated stress by adding the first accumulated stress and the current stress in response to the enable signal, a memory that stores the second accumulated stress and provides the first accumulated stress to the compensator and the accumulation stress calculator, and an operating time calculator that receives a current operating frequency and outputs the enable signal of an active level based on the current operating frequency.

In an embodiment, the operating time calculator may calculate a frame weight corresponding to a ratio of a maximum operating frequency of the current operating frequency to the current operating frequency, may calculate a first accumulated frame weight obtained by accumulating the frame weight at each frame, and may output the enable signal of the active level when the first accumulated frame weight is greater than or equal to an update reference value.

In an embodiment, when the first accumulated frame weight is greater than or equal to the update reference value, the operating time calculator may output a difference between the first accumulated frame weight and the update reference value as a second accumulated frame weight.

In an embodiment, when the enable signal is at the active level, the operating time calculator may output a sum of the second accumulated frame weight and the frame weight as the first accumulated frame weight.

In an embodiment, when the first accumulated frame weight is less than the update reference value, the operating time calculator may output the first accumulated frame weight as the second accumulated frame weight.

In an embodiment, when the first accumulated frame weight is less than the update reference value, the operating time calculator may output the enable signal of an inactive level.

In an embodiment, when the enable signal is at the inactive level, the stress converter and the accumulation stress calculator may be inactive.

In an embodiment, when the current operating frequency is lower than a frequency corresponding to the update reference value, the operating time calculator may calculate the second accumulated frame weight according to Equation "$F\_AW2=F\_AW1-(U\_REF\times(U\_FREQ/FREQ))$". F_AW2 denotes the second accumulated frame weight, F_AW1 denotes the first accumulated frame weight, U_REF denotes the update reference value, U_REF denotes a frequency corresponding to the update reference value, and FREQ denotes the current operating frequency.

In an embodiment, when the current operating frequency is lower than a frequency corresponding to the update reference value, the accumulation stress calculator may calculate the second accumulated stress according to Equation "$AStr(t)=AStr(t-1)+Str(t)\times W$". AStr(t) denotes the second accumulated stress, AStr(t−1) denotes the first accumulated stress, Str(t) denotes the current stress, and W denotes a weight.

In an embodiment, when the enable signal is at the active level, the compensator may receive the first accumulated stress, which is new, from the memory.

In an embodiment of the disclosure, a display device includes a display panel including a pixel and a driving controller that receives an input image signal, calculates a compensation value based on accumulated stress, and provides the display panel with an output image signal obtained by compensating for the input image signal with the compensation value. The driving controller accumulates a frame weight based on a current operating frequency in a variable frequency mode and calculates the accumulated stress again based on the output image signal when an accumulated frame weight is greater than or equal to an update reference value.

In an embodiment, the driving controller may include a compensator that calculates the compensation value based on first accumulated stress, and outputs the output image signal obtain by compensating for the input image signal with the compensation value, a stress converter that converts the output image signal into current stress in response to an enable signal, an accumulation stress calculator that outputs second accumulated stress obtained by adding the first accumulated stress and the current stress in response to the enable signal, a memory that stores the second accumulated stress and provides the first accumulated stress to the compensator and the accumulation stress calculator, and an operating time calculator that calculates the accumulated frame weight based on the current operating frequency and outputs the enable signal of an active level when the accumulated frame weight is greater than or equal to the update reference value.

In an embodiment, the operating time calculator may calculate a frame weight corresponding to a ratio of a maximum operating frequency of the current operating frequency to the current operating frequency, may calculate a first accumulated frame weight obtained by accumulating the frame weight at each frame, and may output the enable signal of the active level when the first accumulated frame weight is greater than or equal to the update reference value.

In an embodiment, when the first accumulated frame weight is greater than or equal to the update reference value, the operating time calculator may output a difference between the first accumulated frame weight and the update reference value as a second accumulated frame weight.

In an embodiment, when the enable signal is at the active level, the operating time calculator may output a sum of the second accumulated frame weight and the frame weight as the first accumulated frame weight.

In an embodiment, when the first accumulated frame weight is less than the update reference value, the operating time calculator may output the first accumulated frame weight as the second accumulated frame weight.

In an embodiment, when the first accumulated frame weight is less than the update reference value, the operating time calculator may output the enable signal of an inactive level.

In an embodiment, when the enable signal is at the inactive level, the stress converter and the accumulation stress calculator may be inactive.

In an embodiment, the pixel may include a light-emitting element and a first transistor electrically connected to the light-emitting element and for providing the light-emitting element with a current corresponding to the output image signal. The compensation value may be a value for compensating for deterioration characteristics of the first transistor.

In an embodiment of the disclosure, an operating method of a display device includes receiving an input image signal and a current operating frequency, outputting an output image signal based on the input image signal and first accumulated stress, calculating a first accumulated frame weight based on the current operating frequency, outputting an enable signal of an active level when the first accumulated frame weight is greater than or equal to an update reference value, converting the output image signal into current stress when the enable signal is at the active level, and calculating second accumulated stress based on the first accumulated stress and the current stress and storing the second accumulated stress in a memory when the enable signal is at the active level. The second accumulated stress stored in the memory is provided as the first accumulated stress.

In an embodiment, the outputting the enable signal of the active level may include calculating a frame weight corresponding to a ratio of a maximum operating frequency of the current operating frequency to the current operating frequency, calculating the first accumulated frame weight obtained by accumulating the frame weight at each frame, and outputting the enable signal of the active level when the first accumulated frame weight is greater than or equal to the update reference value.

In an embodiment, the outputting the enable signal of the active level may include outputting a difference between the first accumulated frame weight and the update reference value as a second accumulated frame weight when the first accumulated frame weight is greater than or equal to the update reference value.

BRIEF DESCRIPTION OF THE DRAWINGS

The above and other objects and features of the disclosure will become apparent by describing in detail embodiments thereof with reference to the accompanying drawings.

DETAILED DESCRIPTION

Figure 1:
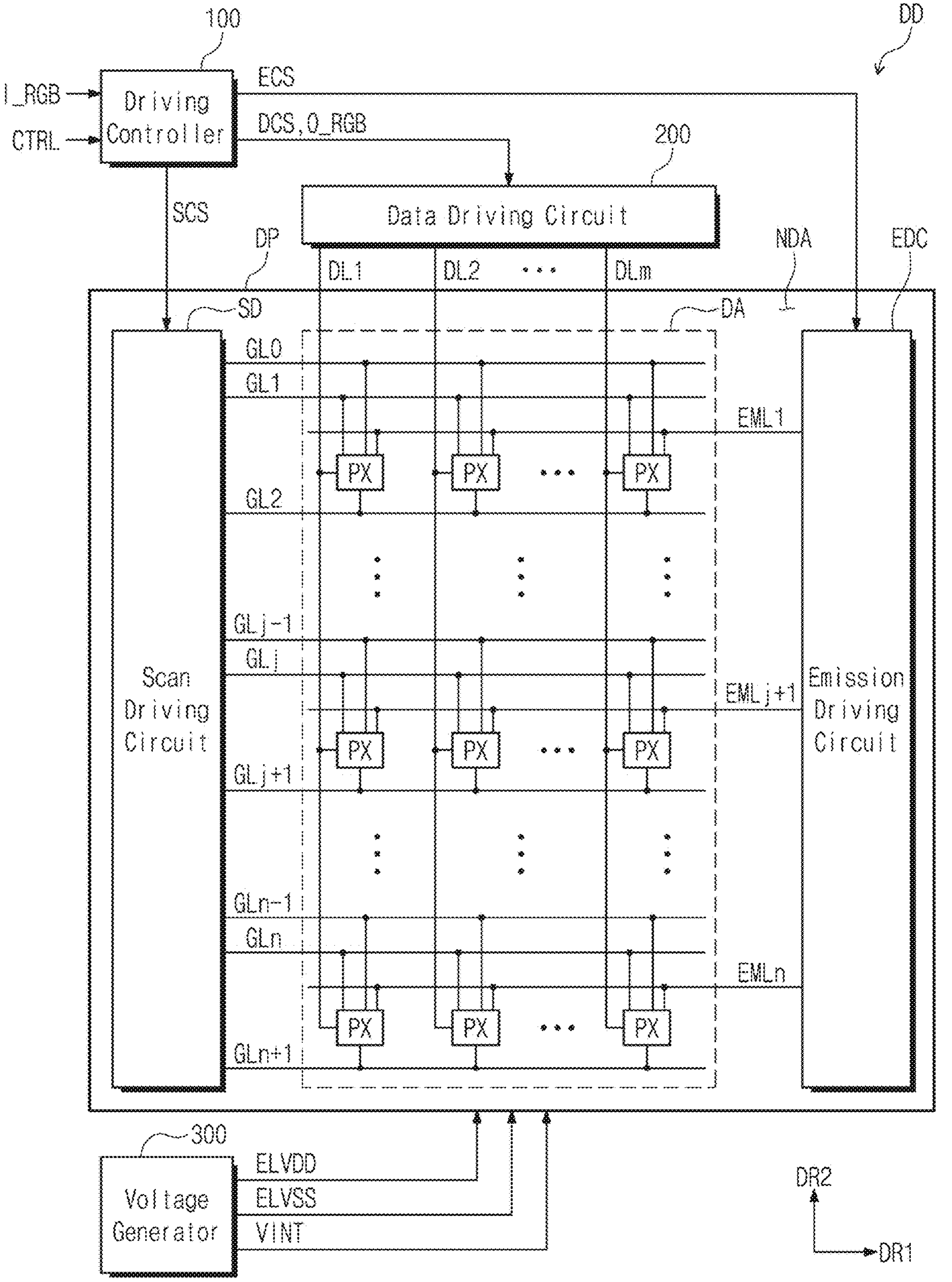
FIG. 1 is a block diagram of an embodiment of a display device, according to the disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, without departing from the scope and spirit of the disclosure, a first component may be also referred to as a second component, and similarly, the second component may be also referred to as the first component. The articles "a," "an," and "the" are singular in that they have a single referent, but the use of the singular form in the specification should not preclude the presence of more than one referent.

Also, the terms “under”, “beneath”, “on”, “above”, etc. are used to describe a relationship between components illustrated in a drawing. The terms are relative and are described with reference to a direction indicated in the drawing.

It will be understood that the terms “include”, “comprise”, “have”, etc. specify the presence of features, numbers, steps, operations, elements, or components, described in the specification, or any combinations thereof, not precluding the presence or additional possibility of one or more other features, numbers, steps, operations, elements, or components or any combinations thereof.

Unless otherwise defined, all terms (including technical terms and scientific terms) used in this specification have the same meaning as commonly understood by those skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

FIG. 1 is a block diagram of an embodiment of a display device, according to the disclosure.

Referring to FIG. 1, the display device DD includes a driving controller 100, a data driving circuit 200, a voltage generator 300, and a display panel DP. In an embodiment, a display area DA and a non-display area NDA surrounding the display area DA may be defined in the display panel DP.

The driving controller 100 receives an input image signal I_RGB and a control signal CTRL. The driving controller 100 outputs an output image signal O_RGB that is obtained by converting the input image signal I_RGB to be suitable for the data driving circuit 200 and the display panel DP. The driving controller 100 outputs a scan control signal SCS, a data control signal DCS, and an emission control signal ECS.

In an embodiment, the driving controller 100 calculates a compensation value based on accumulated stress and outputs the output image signal O_RGB obtained by compensating for the input image signal I_RGB by the compensation value.

In an embodiment, the driving controller 100 may accumulate a frame weight based on a current operating frequency in a variable frequency mode. When the accumulated frame weight is greater than or equal to an update reference value, the driving controller 100 may calculate accumulated stress again based on the output image signal O_RGB. The circuit configuration and operation of the driving controller 100 will be described in detail later.

The data driving circuit 200 receives the data control signal DCS and the output image signal O_RGB from the driving controller 100. The data driving circuit 200 converts the output image signal O_RGB into data signals and outputs the data signals to a plurality of data lines DL1 to DLm to be described later. The data signals refer to analog voltages corresponding to a grayscale value of the output image signal O_RGB.

The display panel DP includes scan lines GL0 to GLn+1, emission control lines EML1 to EMLn, the data lines DL1 to DLm, and the pixels PX. Here, n and m are natural numbers. The pixels PX may display an image in the display area DA. The display panel DP may further include a scan driving circuit SD and an emission driving circuit EDC in the non-display area NDA. In an embodiment, the scan driving circuit SD may be arranged on a first side (e.g., left side in FIG. 1) of the display panel DP. The scan lines GL0 to GLn+1 extend from the scan driving circuit SD in the first direction DR1.

The emission driving circuit EDC is arranged on a second side (e.g., right side in FIG. 1) of the display panel DP. The emission control lines EML1 to EMLn extend from the emission driving circuit EDC in a direction opposite to the first direction DR1.

The scan lines GL0 to GLn+1 and the emission control lines EML1 to EMLn are arranged spaced from one another in the second direction DR2. The data lines DL1 to DLm extend from the data driving circuit 200 in a direction opposite to the second direction DR2, and are arranged spaced from one another in the first direction DR1.

In the embodiment shown in FIG. 1, the scan driving circuit SD and the emission driving circuit EDC are arranged to face each other with the pixels PX interposed therebetween, but the disclosure is not limited thereto. In an embodiment, the scan driving circuit SD and the emission driving circuit EDC may be disposed adjacent to each other on one of the first side and the second side of the display panel DP, for example. In an embodiment, the scan driving circuit SD and the emission driving circuit EDC may be implemented with one circuit.

The plurality of pixels PX is electrically connected to the scan lines GL0 to GLn+1, the emission control lines EML1 to EMLn, and the data lines DL1 to DLm. In an embodiment, each of the plurality of pixels PX may be electrically connected to three scan lines and one emission control line. In an embodiment, as shown in FIG. 1, a first row of pixels may be connected to the scan lines GL0, GL1, and GL2 and the emission control line EML1, for example. Furthermore, the j-th row of pixels may be connected to the scan lines GLj−1, GLj, and GLj+1 and the emission control line EMLj. Here, j is a natural number less than or equal to n.

Each of the plurality of pixels PX includes a light-emitting element ED (refer to FIG. 2) and a pixel circuit PXC (refer to FIG. 2) for controlling the light emission of the light-emitting element ED. The pixel circuit PXC may include one or more transistors and one or more capacitors. The scan driving circuit SD and the emission driving circuit EDC may include transistors formed through the same process as the pixel circuit PXC.

Each of the plurality of pixels PX receives the first driving voltage ELVDD, the second driving voltage ELVSS, and the initialization voltage VINT.

The scan driving circuit SD receives the scan control signal SCS from the driving controller 100. The scan driving circuit SD may output scan signals to the scan lines GL0 to GLn+1 in response to the scan control signal SCS.

The driving controller 100 in an embodiment may calculate deterioration characteristics of the pixels PX, may compensate for the input image signal I_RGB based on the calculated deterioration characteristics (e.g., deterioration characteristics due to accumulated stress of a transistor), and may output the output image signal O_RGB.

Figure 2:
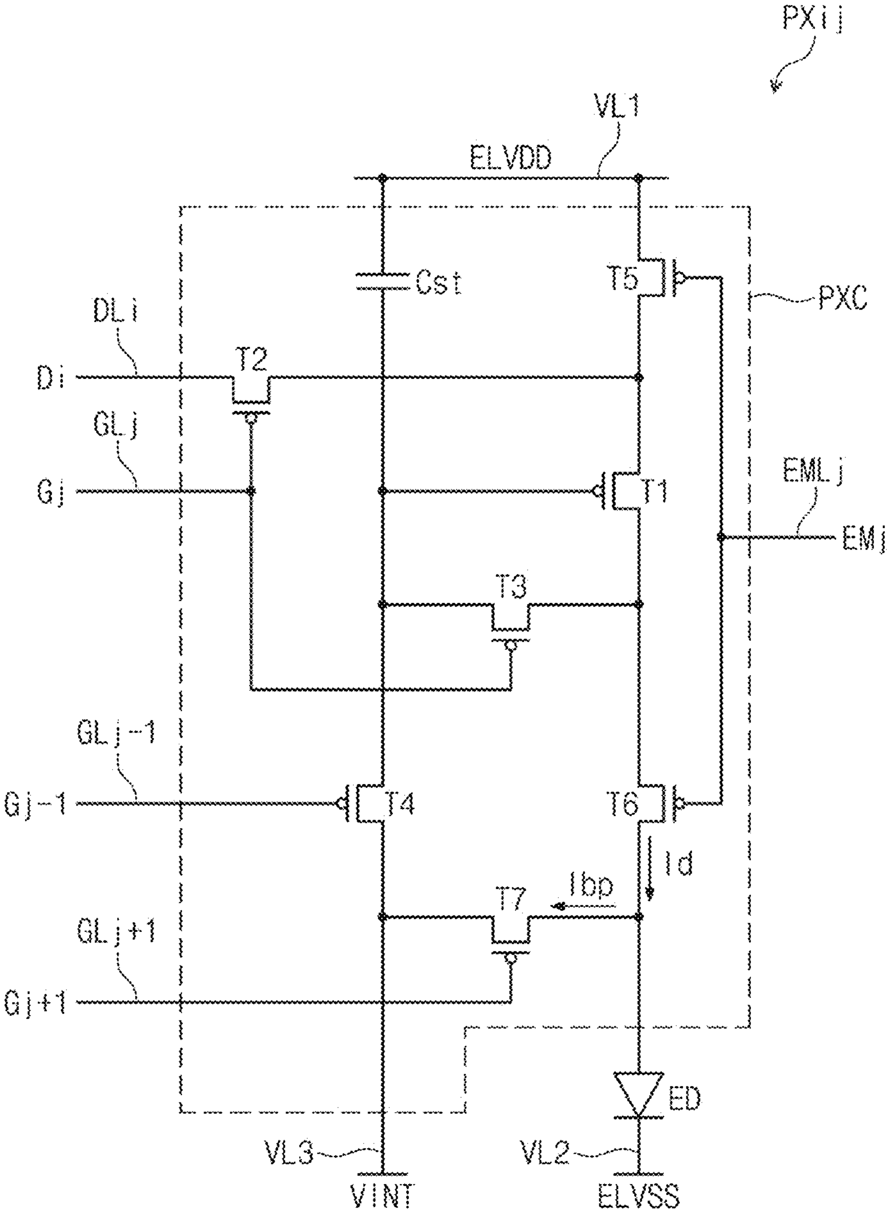
FIG. 2 is an equivalent circuit diagram of an embodiment of a pixel, according to the disclosure.

FIG. 2 is an equivalent circuit diagram of an embodiment of a pixel, according to the disclosure.

FIG. 2 illustrates an equivalent circuit diagram of a pixel PXij connected to the i-th data line DLi among the data lines DL1 to DLm (i.e., i is a natural number less than or equal to m), the (j−1)-th scan lines GLj−1, the j-th scan lines GLj−1, and the (j+1)-th scan lines GLj+1 among the scan lines GL0 to GLn+1, and the j-th emission control line EMLj among the emission control lines EML1 to EMLn, which are illustrated in FIG. 1.

Each of the plurality of pixels PX shown in FIG. 1 may have the same circuit configuration as the equivalent circuit diagram of the pixel PXij shown in FIG. 2. The pixel PXij includes the pixel circuit PXC and at least one light-emitting element ED. The light-emitting element ED may be a light-emitting diode. In an embodiment, it is described that the one pixel PXij includes the one light-emitting element ED.

In an embodiment, the pixel circuit PXC of the pixel PXij includes first to seventh transistors T1 to T7 and one capacitor Cst. Furthermore, each of the first to seventh transistors T1 to T7 is a P-type transistor having a low-temperature polycrystalline silicon ("LTPS") semiconductor layer. However, the disclosure is not limited thereto. In an embodiment, all of the first to seventh transistors T1 to T7 may be N-type transistors by an oxide semiconductor as a semiconductor layer, for example. In an embodiment, at least one of the first to seventh transistors T1 to T7 may be an N-type transistor and the others thereof may be P-type transistors. Moreover, the circuit configuration of a pixel in an embodiment of the disclosure is not limited to FIG. 2. The pixel circuit PXC illustrated in FIG. 2 is only an example. In an embodiment, the configuration of the pixel circuit PXC may be modified and implemented, for example.

The (j−1)-th scan line GLj−1, the j-th scan line GLj, the (j+1)-th scan line GLj+1, and the j-th emission control line EMLj may deliver a (j−1)-th scan signal Gj−1, a j-th scan signal Gj, a (j+1)-th scan signal Gj+1, and an emission signal EMj, respectively. The i-th data line DLi delivers an i-th data signal Di. The data signal Di may have a voltage level corresponding to the input image signal I_RGB that is input to the display device DD (refer to FIG. 1). The first to third driving voltage lines VL1, VL2, and VL3 may supply a first driving voltage ELVDD, a second driving voltage ELVSS, and an initialization voltage VINT, respectively.

The first transistor T1 includes a first electrode connected with the first driving voltage line VL1 through the fifth transistor T5, a second electrode electrically connected with an anode of the light-emitting element ED through the sixth transistor T6, and a gate electrode connected with a first end of the capacitor Cst. The first transistor T1 may receive the data signal Di delivered through the data line DLi depending on the switching operation of the second transistor T2 and then may supply a driving current Id to the light-emitting element ED.

The second transistor T2 includes a first electrode connected to the data line DLi, a second electrode connected to the first electrode of the first transistor T1, and a gate electrode connected to the j-th scan line GLj. The second transistor T2 may be turned on in response to the scan signal Gj received through the j-th scan line GLj and may deliver the data signal Di delivered from the data line DLi to the first electrode of the first transistor T1.

The third transistor T3 includes a first electrode connected to the gate electrode of the first transistor T1, a second electrode connected to the second electrode of the first transistor T1, and a gate electrode connected to the j-th scan line GLj. The third transistor T3 may be turned on in response to the scan signal Gj transferred through the j-th scan line GLj, and thus, the gate electrode and the second electrode of the first transistor T1 may be connected, that is, the first transistor T1 may be diode-connected.

The fourth transistor T4 includes a first electrode connected to the gate electrode of the first transistor T1, a second electrode connected to the third voltage line VL3 through which the initialization voltage VINT is delivered, and a gate electrode connected to the (j−1)-th scan line GLj−1. The fourth transistor T4 may be turned on in response to the scan signal Gj−1 received through the (j−1)-th scan line GLj−1 such that the initialization voltage VINT is transferred to the gate electrode of the first transistor T1. As such, a voltage of the gate electrode of the first transistor T1 may be initialized. This operation may be also referred to as an "an initialization operation".

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light-emitting element ED, and a gate electrode connected to the emission control line EMLj.

The fifth transistor T5 and the sixth transistor T6 may be simultaneously turned on in response to the emission signal EMj transferred through the emission control line EMLj. As such, the first driving voltage ELVDD may be compensated for through the diode-connected transistor T1 so as to be supplied to the light-emitting element ED.

The seventh transistor T7 includes a first electrode connected to the second electrode of the fourth transistor T4, a second electrode connected to the second electrode of the sixth transistor T6, and a gate electrode connected to the (j+1)-th scan line GLj+1.

The first end of the capacitor Cst is connected with the gate electrode of the first transistor T1 as described above, and a second end of the capacitor Cst is connected with the first driving voltage line VL1. A cathode of the light-emitting element ED may be connected with the second driving voltage line VL2 that transfers the second driving voltage ELVSS.

Figure 3:
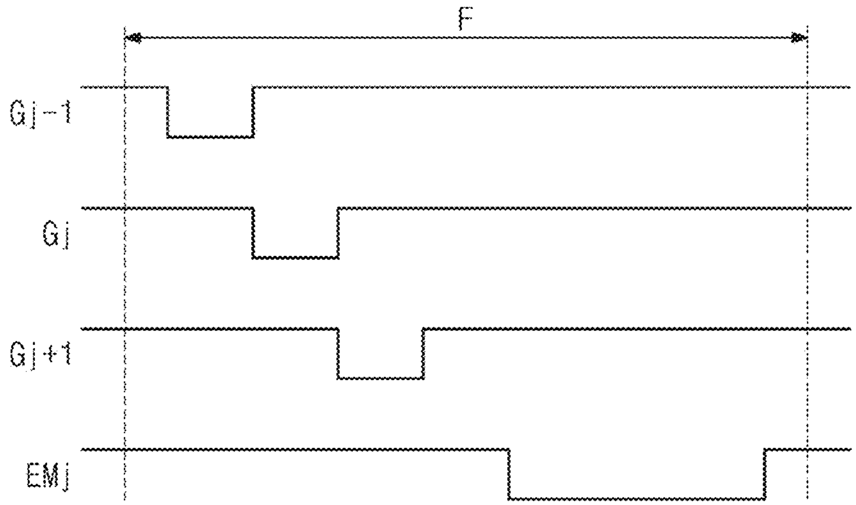
FIG. 3 is a timing diagram for describing an operation of a pixel illustrated in FIG. 2.

FIG. 3 is a timing diagram for describing an operation of a pixel illustrated in FIG. 2. Hereinafter, an operation of a display device in an embodiment will be described with reference to FIGS. 2 and 3.

Referring to FIGS. 2 and 3, the (j−1)-th scan signal Gj−1 having a low level (active level) is provided through the (j−1)-th scan line GLj−1 during an initialization interval within one frame F. When the fourth transistor T4 is turned on in response to the (j−1)-th scan signal Gj−1 having a low level, the initialization voltage VINT is supplied to the gate electrode of the first transistor T1 through the fourth transistor T4 so as to initialize the first transistor T1.

Next, when the j-th scan signal Gj having a low level is supplied through the j-th scan line GLj during a data programming and compensation interval, the third transistor T3 is turned on. The first transistor T1 is diode-connected by the third transistor T3 thus turned on to be forward-biased. At this time, the second transistor T2 is turned on by the j-th scan signal Gj having a low level. In the case, a compensation voltage, which is obtained by reducing the voltage of the data signal Di supplied from the data line DLi by a threshold voltage of the first transistor T1, is applied to the gate electrode of the first transistor T1.

As the first driving voltage ELVDD and the compensation voltage are respectively applied to opposite ends of the capacitor Cst, charges corresponding to a difference in voltage between the opposite ends may be stored in the capacitor Cst.

In an embodiment, the seventh transistor T7 is turned on in response to the (j+1)-th scan signal Gj+1 having a low level that is delivered through the (j+1)-th scan line GLj+1. A portion of a current of the anode of the light-emitting element ED may be drained by the seventh transistor T7 through the seventh transistor T7 as a bypass current.

When the light-emitting element ED emits light under the condition that a minimum current of the first transistor T1 flows as a driving current for the purpose of displaying a black image, the black image may not be normally displayed. Accordingly, the seventh transistor T7 in the pixel PXij in an embodiment of the disclosure may distribute a part of the minimum current of the first transistor T1 as a bypass current to the third voltage line VL3. Herein, the minimum current of the first transistor T1 means a current flowing under the condition that a gate-source voltage of the first transistor T1 is smaller than the threshold voltage of the first transistor T1, that is, the first transistor T1 is turned off. As a minimum driving current is transferred to the light-emitting element ED, with the first transistor T1 turned off, an image of black luminance is expressed. When the minimum driving current for displaying a black image flows, the influence of a bypass transfer of the bypass current flowing through the third voltage line VL3 may be great. In contrast, when a large driving current for displaying an image such as a normal image or a white image flows, there may be almost no influence of the bypass current Ibp. Accordingly, the light-emitting element ED may clearly express a black image. Accordingly, a contrast ratio may be improved by implementing an accurate black luminance image by the seventh transistor T7. In an embodiment, the gate electrode of the seventh transistor T7 receives the (j+1)-th scan signal Gj+1, but is not limited thereto.

Next, during a light-emitting interval, the emission signal EMj supplied from the emission control line EMLj is changed from a high level to a low level. During a light-emitting interval, the fifth transistor T5 and the sixth transistor T6 are turned on by the emission signal EMj having a low level. In this case, the driving current according to a voltage difference between the gate voltage of the gate electrode of the first transistor T1 and the first driving voltage ELVDD is generated and supplied to the light-emitting element ED through the sixth transistor T6, and the current flows through the light-emitting element ED.

As such, the current provided to the light-emitting element ED may be determined depending on a voltage difference (i.e., a gate-source voltage of the first transistor T1) between the voltage of the gate electrode of the first transistor T1 and the first driving voltage ELVDD. The threshold voltage of the first transistor T1 may change depending on the gate-source voltage of the first transistor T1.

Figure 4A:
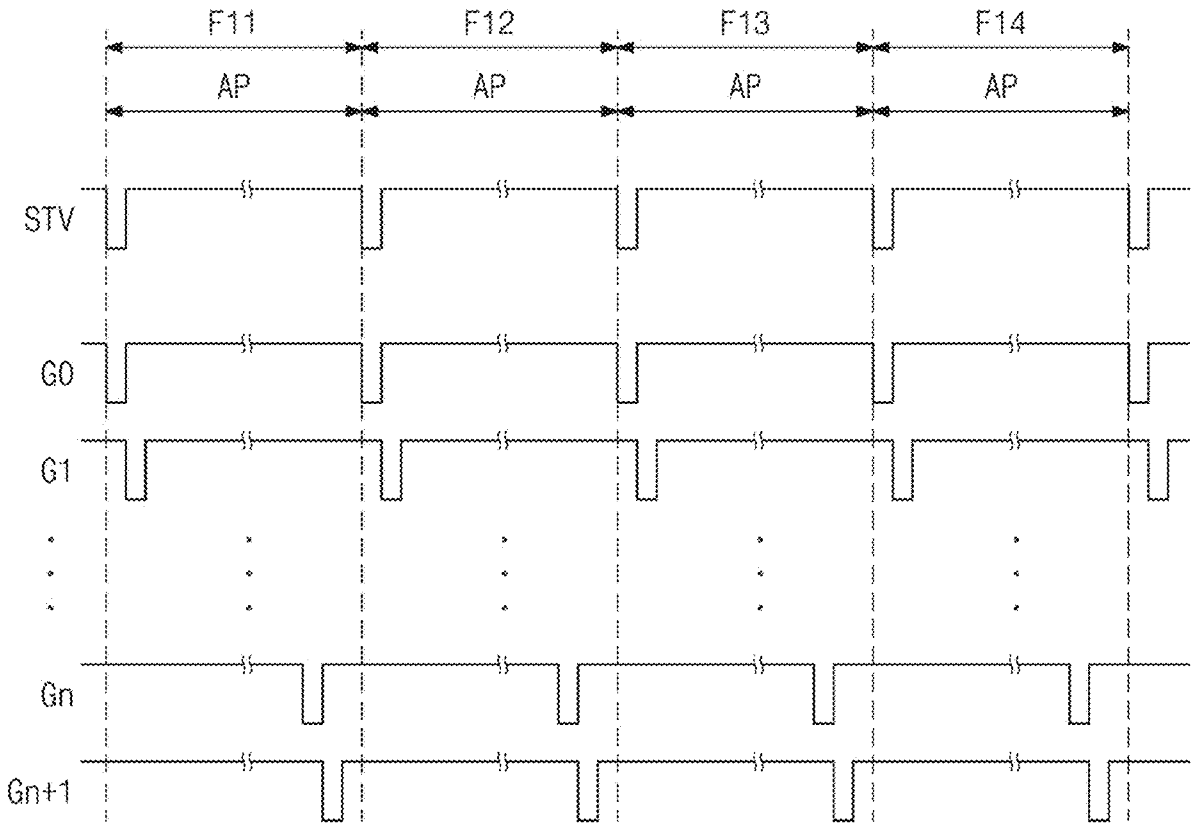
FIG. 4A is a timing diagram of a start signal and scan signals when an operating frequency of a display device is a first frequency.

FIG. 4A is a timing diagram of a start signal and scan signals when an operating frequency of the display device DD is a first frequency (e.g., about 120 hertz (Hz)).

Referring to FIGS. 1 and 4A, a start signal STV may be a signal included in the control signal CTRL provided from an external host device (e.g., an application processor, a main processor, a host processor, a graphics processor, or the like). The start signal STV may be a signal indicating the start of one frame.

When an operating frequency is a first frequency (e.g., about 120 Hz), the scan driving circuit SD sequentially activates the scan signals GO to Gn+1 to be at a low level during each of frames F11, F12, F13, and F14. Only the scan signals GO to Gn+1 are shown in FIG. 4A. However, the emission control signals EM1 to EMn may be sequentially activated during each of the frames F11, F12, F13, and F14. Each of the frames F11, F12, F13, and F14 may be an active period AP.

Figure 4B:
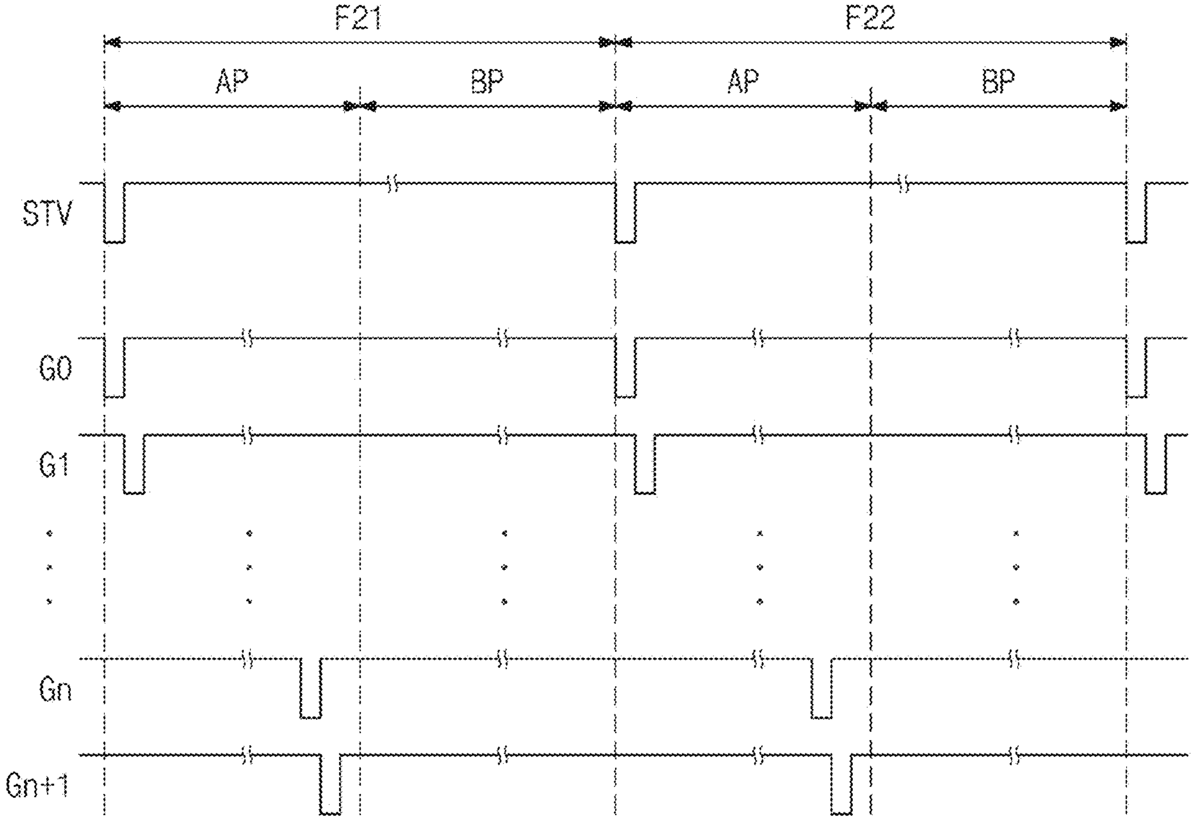
FIG. 4B is a timing diagram of a start signal and scan signals when an operating frequency of a display device is a second frequency.

FIG. 4B is a timing diagram of a start signal and scan signals when an operating frequency of the display device DD is a second frequency (e.g., about 60 Hz).

Referring to FIGS. 1 and 4B, when an operating frequency is a second frequency (e.g., about 60 Hz), the duration of each of frames F21 and F22 may be twice the duration of each of the frames F11, F12, F13, and F14 shown in FIG. 4A. Each of the frames F21 and F22 may include one active period AP and one blank period BP. The scan driving circuit SD sequentially activates the scan signals GO to Gn+1 to be at a low level during the active period AP of each of the frames F21 and F22. Only the scan signals GO to Gn+1 are shown in FIG. 4B. However, the emission control signals EM1 to EMn may be sequentially activated during the active period AP of each of the frames F21 and F22.

During the blank period BP of each of the frames F21 and F22, the scan driving circuit SD may maintain the scan signals GO to Gn+1 at an inactive level (e.g., a high level). During the blank period BP of each of the frames F21 and F22, the emission driving circuit EDC may maintain the emission control signals EM1 to EMn at an inactive level (e.g., a high level).

In an embodiment, during the blank period BP of each of the frames F21 and F22, the emission driving circuit EDC may sequentially activate the emission control signals EM1 to EMn. That is, during the blank period BP of each of the frames F21 and F22, the light-emitting element ED may emit light by the charge charged in the capacitor Cst as the fifth and sixth transistors T5 and T6 are turned on.

Figure 4C:
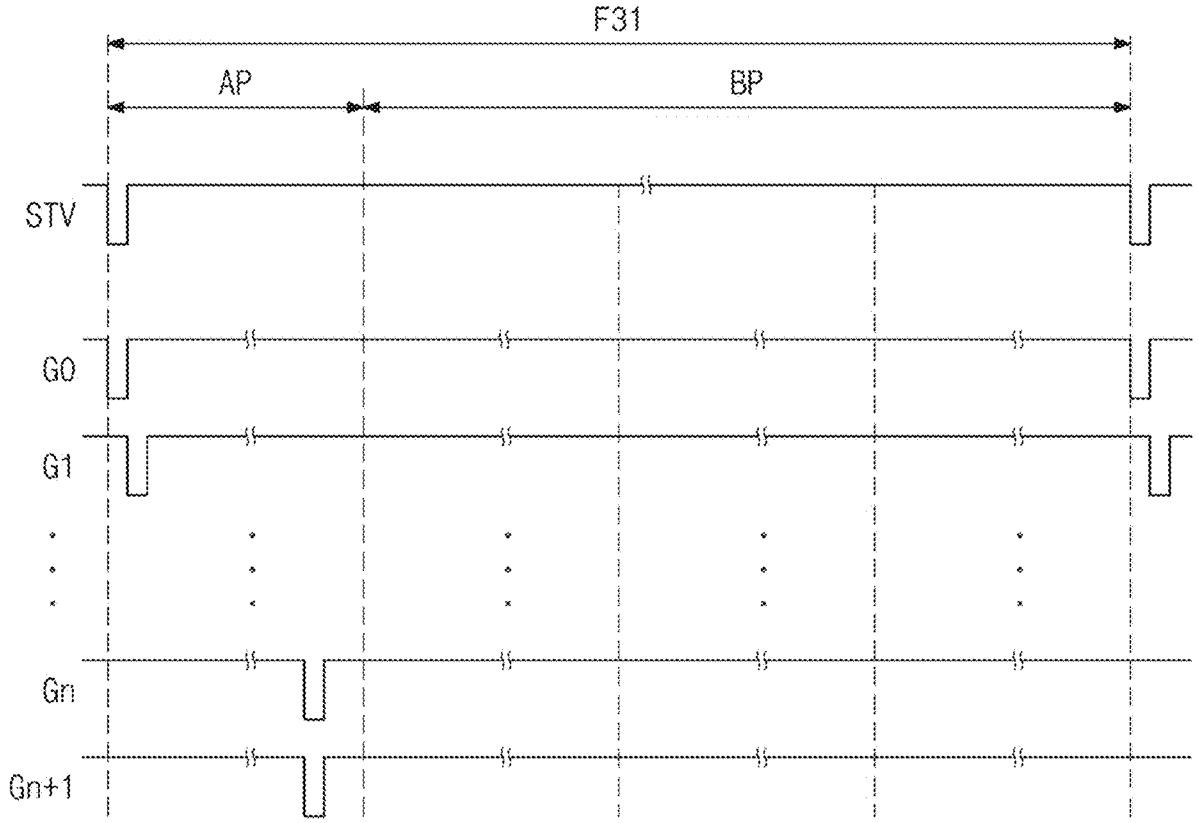
FIG. 4C is a timing diagram of a start signal and scan signals when an operating frequency of a display device is a third frequency.

FIG. 4C is a timing diagram of a start signal and scan signals when an operating frequency of the display device DD is a third frequency (e.g., about 30 Hz).

Referring to FIGS. 1 and 4C, when an operating frequency is a third frequency (e.g., about 30 Hz), the duration of a frame F31 may be twice the duration of each of the frames F21 and F22 shown in FIG. 4B. The duration of the frame F31 may be four times the duration of each of the frames F11, F12, F13, and F14 shown in FIG. 4A.

The frame F31 may include one active period AP and one blank period BP. During the active period AP, the scan driving circuit SD sequentially activates the scan signals GO to Gn+1 to be at a low level. Only the scan signals GO to Gn+1 are shown in FIG. 4C. However, the emission control signals EM1 to EMn may be sequentially activated during the active period AP of the frame F31.

During the blank period BP of the frame F31, the scan driving circuit SD may maintain the scan signals GO to Gn+1 at an inactive level (e.g., a high level). In an embodiment, a duration of the blank period BP of the frame F31 may be three times the duration of each of the blank periods BP of the frames F21 and F22 shown in FIG. 4B.

Although not illustrated in FIG. 4C, the emission driving circuit EDC may maintain the emission control signals EM1 to EMn at an inactive level (e.g., a high level) during the blank period BP.

In an embodiment, during the blank period BP of the frame F31, the emission driving circuit EDC may sequentially activate the emission control signals EM1 to EMn. That is, during the blank period BP of the frame F31, the light-emitting element ED may emit light by the charge charged in the capacitor Cst as the fifth and sixth transistors T5 and T6 are turned on.

Figure 5A:
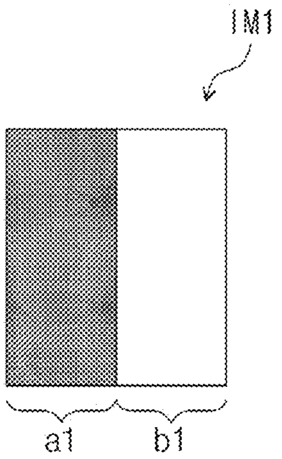
FIGS. 5A, 5B, and 5C illustrate images displayed on a display device.
Figure 5B:
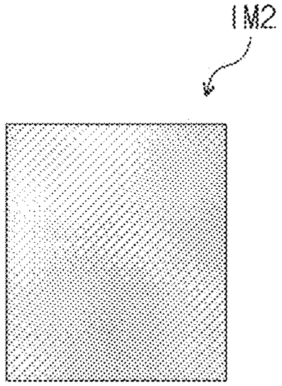
Figure 5C:
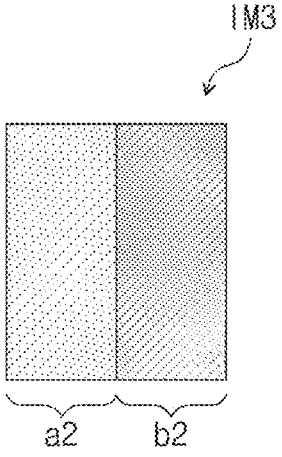

FIGS. 5A, 5B, and 5C illustrate images displayed on a display device.

Referring to FIG. 5A, a first image IM1 may be displayed on the display device DD (refer to FIG. 1). The first image IM1 includes a black image a1 and a white image b1. After the first image IM1 is displayed on the display device DD during a predetermined time or more (e.g., 60 seconds), a second image IM2 shown in FIG. 5B may be displayed on the display device DD. The second image IM2 may be an image of which the grayscale level is higher than the grayscale level of the black image a1 and is lower than the grayscale level of the white image b1.

Ideally, the second image IM2 shown in FIG. 5B is desired to be displayed on the display device DD. However, a third image IM3 shown in FIG. 5C may be displayed on the display device DD.

This is due to hysteresis characteristics of the first transistor T1 in the pixel PXij. The threshold voltage of the first transistor T1 may change depending on the gate-source voltage of the first transistor T1. In an embodiment, when the gate-source voltage is rising from a low level to a high level, the threshold voltage of the first transistor T1 may have a first average level. However, when the gate-source voltage decreases from a high level to a low level, the threshold voltage of the first transistor T1 may have a second average level different from the first average level, for example. The first average level and the second average level may derive different current-voltage characteristic curves of the first transistor T1. The dependency of the threshold voltage on the gate-source voltage may be also referred to as a "hysteresis of a transistor".

According to the hysteresis characteristic of the first transistor T1, the driving current of the first transistor T1 by the data signal Di applied in a current frame may be affected by the data signal Di applied in a previous frame. In detail, when the data signal Di for displaying an image of a predetermined grayscale as shown in FIG. 5B is provided in the current frame after the data signal Di for displaying the black image a1 of FIG. 5A is applied in the previous frame, an image a2 of a grayscale that is higher than the predetermined grayscale of the current frame may be displayed on the light-emitting element ED as shown in FIG. 5C.

Moreover, when the data signal Di for displaying an image of a predetermined grayscale as shown in FIG. 5B is provided in the current frame after the data signal Di for displaying the white image b1 of FIG. 5A is applied in the previous frame, an image b2 of a grayscale that is lower than the predetermined grayscale of the current frame may be displayed on the light-emitting element ED as shown in FIG. 5C. That is, the image of the previous frame may remain as an afterimage in the current frame.

The driving controller 100 (refer to FIG. 1) in an embodiment calculates the accumulated stress of the first transistor T1 in the pixels PX based on a grayscale level of the input image signal I_RGB corresponding to each of the pixels PX (refer to FIG. 1) and outputs the output image signal O_RGB by compensating for the input image signal I_RGB with a compensation value corresponding to the accumulated stress.

Figure 6:
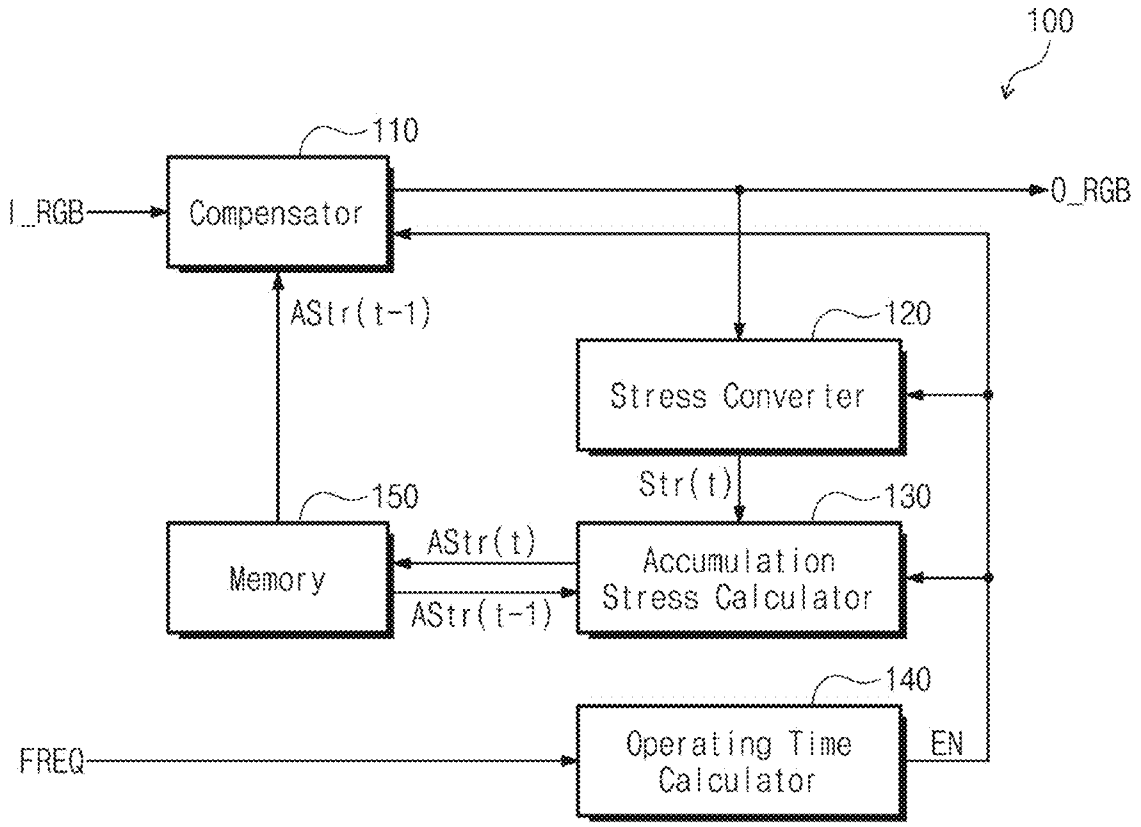
FIG. 6 is a block diagram illustrating a configuration of a driving controller.

FIG. 6 is a block diagram illustrating a configuration of a driving controller.

Referring to FIG. 6, the driving controller 100 includes a compensator 110, a stress converter 120, an accumulation stress calculator 130, an operating time calculator 140, and a memory 150.

The compensator 110 receives the input image signal I_RGB and outputs the output image signal O_RGB based on first accumulated stress AStr(t−1). In an embodiment, the compensator 110 may receive new first accumulated stress AStr(t−1) in response to an enable signal EN.

The stress converter 120 converts the output image signal O_RGB into current stress Str(t) in response to the enable signal EN. The current stress Str(t) may be a stress voltage level corresponding to the output image signal O_RGB.

The accumulation stress calculator 130 calculates second accumulated stress AStr(t) by adding the first accumulated stress AStr(t−1) stored in the memory 150 and the current stress Str(t) from the stress converter 120 in response to the enable signal EN. The second accumulated stress AStr(t) may be stored in the memory 150.

The operating time calculator 140 receives a current operating frequency FREQ and outputs the enable signal EN based on the current operating frequency FREQ. The enable signal EN may be provided to the stress converter 120 and the accumulation stress calculator 130. In an embodiment, the current operating frequency FREQ may be a signal included in the control signal CTRL provided from an external host device (e.g., an application processor, a main processor, a host processor, a graphics processor, or the like). In an embodiment, the current operating frequency FREQ may not be provided from outside, but may be generated inside the driving controller 100. In an embodiment, the driving controller 100 determines the operating frequency based on the start signal STV included in the control signal CTRL, a data enable signal indicating whether the input image signal I_RGB is a valid signal, or the like and may output the current operating frequency FREQ corresponding to the operating frequency, for example. In an embodiment, the operating time calculator 140 may generate the current operating frequency FREQ based on the control signal CTRL without receiving the current operating frequency FREQ from the outside.

In an embodiment, the compensator 110 and the memory 150 may be implemented as a single circuit block. In an embodiment, the memory 150 may be included in the compensator 110, for example.

In an embodiment, to calculate a compensation value for the input image signal I_RGB, the compensator 110 may convert the input image signal I_RGB into a voltage domain of a predetermined bit (e.g., 5 bits). In an embodiment, the driving controller 100 may further include a circuit block that converts the input image signal I_RGB into a voltage domain of a predetermined bit (e.g., 5 bits). In this case, the stress converter 120 may output the current stress Str(t) obtained by converting the output image signal O_RGB into a voltage domain of a predetermined bit (e.g., 5 bits).

In an embodiment, the compensation value calculated by the compensator 110 may be a value for compensating for deterioration characteristics of transistors in the pixel PXij illustrated in FIG. 2, that is, the first transistor T1.

Figure 7:
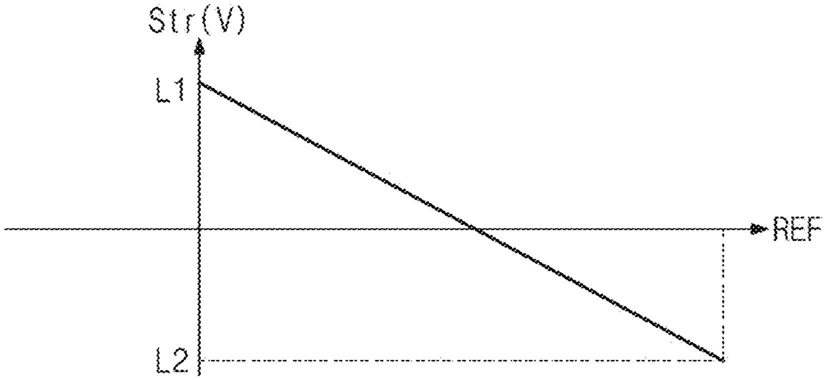
FIG. 7 is a graph illustrating a stress level of an output image signal.

FIG. 7 is a graph illustrating a stress level of an output image signal.

Referring to FIGS. 6 and 7, when the input image signal I_RGB is converted into a stress voltage level Str, the stress voltage level Str may be a value between a first voltage level L1 and a second voltage level L2. When the stress voltage level Str corresponding to the input image signal I_RGB is higher than a reference value REF, it is desired to calculate a compensation value. In addition, even though the stress voltage level Str is lower than the reference value REF, it is desired to calculate the compensation value. As described in FIGS. 5A and 5B, the reason is that compensation for the input image signal I_RGB is desired when the grayscale level of the input image signal I_RGB is high and the grayscale level of the input image signal I_RGB is low.

In an embodiment, the reference value REF may be the first accumulated stress AStr(t−1) stored in the memory 150. The compensator 110 may calculate a compensation value based on a difference value between the stored first accumulated stress AStr(t−1) and the input image signal I_RGB.

Figure 8:
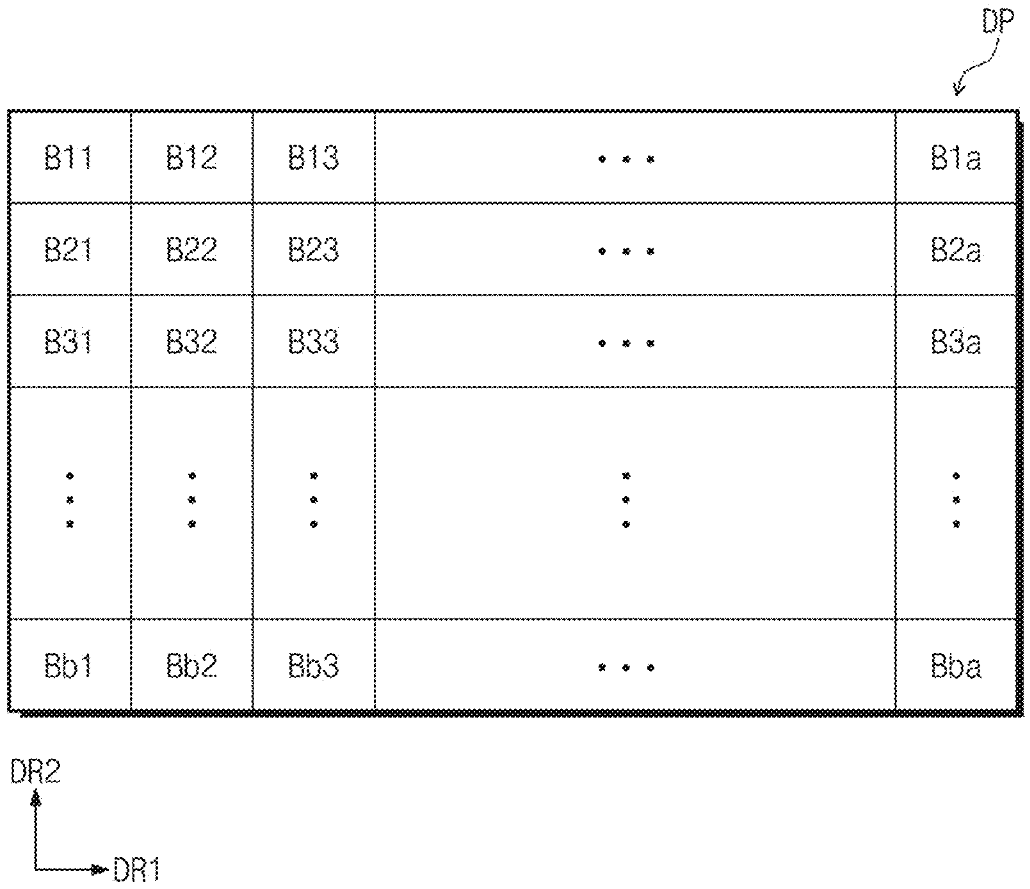
FIG. 8 is a table for describing an operation of the compensator shown in FIG. 6.

FIG. 8 is a table for describing an operation of the compensator 110 shown in FIG. 6.

Referring to FIGS. 6 and 8, the compensator 110 may calculate a compensation value corresponding to each of the pixels PX shown in FIG. 1. However, when the size of the display panel DP (refer to FIG. 1) is great, the number of pixels PX increases. Accordingly, the size of the memory 150 for storing the compensation value is desired to increase.

The compensator 110 may divide the display panel DP into a plurality of blocks (B11 to B1_a_, B21 to B2_a_, B31 to B3_a_, . . . , Bb1 to Bba) (each of 'a' and 'b' are a natural number) and may calculate the compensation value for each block. Each of the plurality of blocks (B11 to B1_a_, B21 to B2_a_, B31 to B3_a_, . . . , Bb1 to Bba) may include a plurality of pixels PX. In an embodiment, each of the plurality of blocks (B11 to B1_a_, B21 to B2_a_, B31 to B3_a_, . . . , Bb1 to Bba) may include the 4×4 pixels PX (i.e., the four pixels PX in the first direction DR1 and the four pixels PX in the second direction DR2).

The compensator 110 may calculate a representative value corresponding to each of the blocks (B11 to B1_a_, B21 to B2_a_, B31 to B3_a_, . . . , Bb1 to Bba) among the input image signal I_RGB and may calculate the compensation value based on the representative value and the first accumulated stress AStr(t−1).

In an embodiment, the compensator 110 may calculate the compensation value corresponding to the block B11 based on the representative value corresponding to the block B111 of the input image signal I_RGB and the first accumulated stress AStr(t−1) corresponding to the blocks B11, for example.

The representative value corresponding to each of the blocks (B11 to B1_a_, B21 to B2_a_, B31 to B3_a_, . . . , Bb1 to Bba) among the input image signal I_RGB may be selected as a value for representing characteristics of the blocks (B11 to B1_a_, B21 to B2_a_, B31 to B3_a_, . . . , Bb1 to Bba), such as an average value, a median value, and a mode value.

The compensator 110 may output the output image signal O_RGB based on the input image signal I_RGB and the compensation value.

In an embodiment, to determine whether the pixels PX are stressed, the first accumulated stress AStr(t−1) corresponding to each of the blocks (B11 to B1_a_, B21 to B2_a_, B31 to B3_a_, . . . , Bb1 to Bba) is desired to be stored during a predetermined time.

In an embodiment, when the number of pixels PX of the display panel DP is 1440×3200 and each of the blocks (B11 to B1_a_, B21 to B2_a_, B31 to B3_a_, . . . , Bb1 to Bba) corresponds to the four pixels PX, the number of blocks (BIT to B1_a_, B21 to B2_a_, B31 to B3_a_, . . . , Bb1 to Bba) is 288000, for example. That is, the number of the first accumulated stress AStr(t−1) corresponding to one frame is also 288000.

In an embodiment, the compensator 110 may calculate the compensation value for every frame. However, when the compensator 110 calculates the compensation value every frame, the power consumption of the driving controller 100 increases.

In an embodiment, the compensator 110 may periodically calculate a new compensation value. In an embodiment, the compensator 110 may calculate anew compensation value every 0.25 seconds corresponding to about 4 Hz, for example. The stress converter 120 and the accumulation stress calculator 130 operate in response to the enable signal EN every 0.25 seconds, and store the second accumulated stress AStr(t) in the memory 150.

The compensator 110 may receive the first accumulated stress AStr(t−1) stored in the memory 150 and may output the output image signal O_RGB based on the first accumulated stress AStr(t−1) and the input image signal I_RGB.

The display device DD may operate in a single frequency mode and a variable frequency mode. The single frequency mode refers to an operating mode in which the current operating frequency FREQ is uniform at each frame. In the single frequency mode, it is relatively easy for the stress converter 120 and the accumulation stress calculator 130 to calculate the second accumulated stress AStr(t) at a predetermined period (e.g., a period corresponding to about 4 Hz) and it is relatively easy for the compensator 110 to calculate a new compensation value at a predetermined period (e.g., a period corresponding to about 4 Hz). In an embodiment, when the current operating frequency FREQ is about 120 Hz, the stress converter 120 and the accumulation stress calculator 130 may be which operate every 30 frames and the compensator 110 may be which calculate a new compensation value every 30 frames, for example. The compensator 110 may calculate a new compensation value at a frequency (e.g., about 4 Hz) lower than the current operating frequency FREQ, thereby reducing the power consumption of the driving controller 100.

In the variable frequency mode, the current operating frequency FREQ of the display device DD may vary for every frame. Accordingly, a new scheme is desired such that, in the single frequency mode, the stress converter 120 and the accumulation stress calculator 130 calculate the second accumulated stress AStr(t) at a predetermined period (e.g., period corresponding to about 4 Hz) and the compensator 110 calculates a new compensation value a predetermined period (e.g., period corresponding to about 4 Hz).

Figure 9:
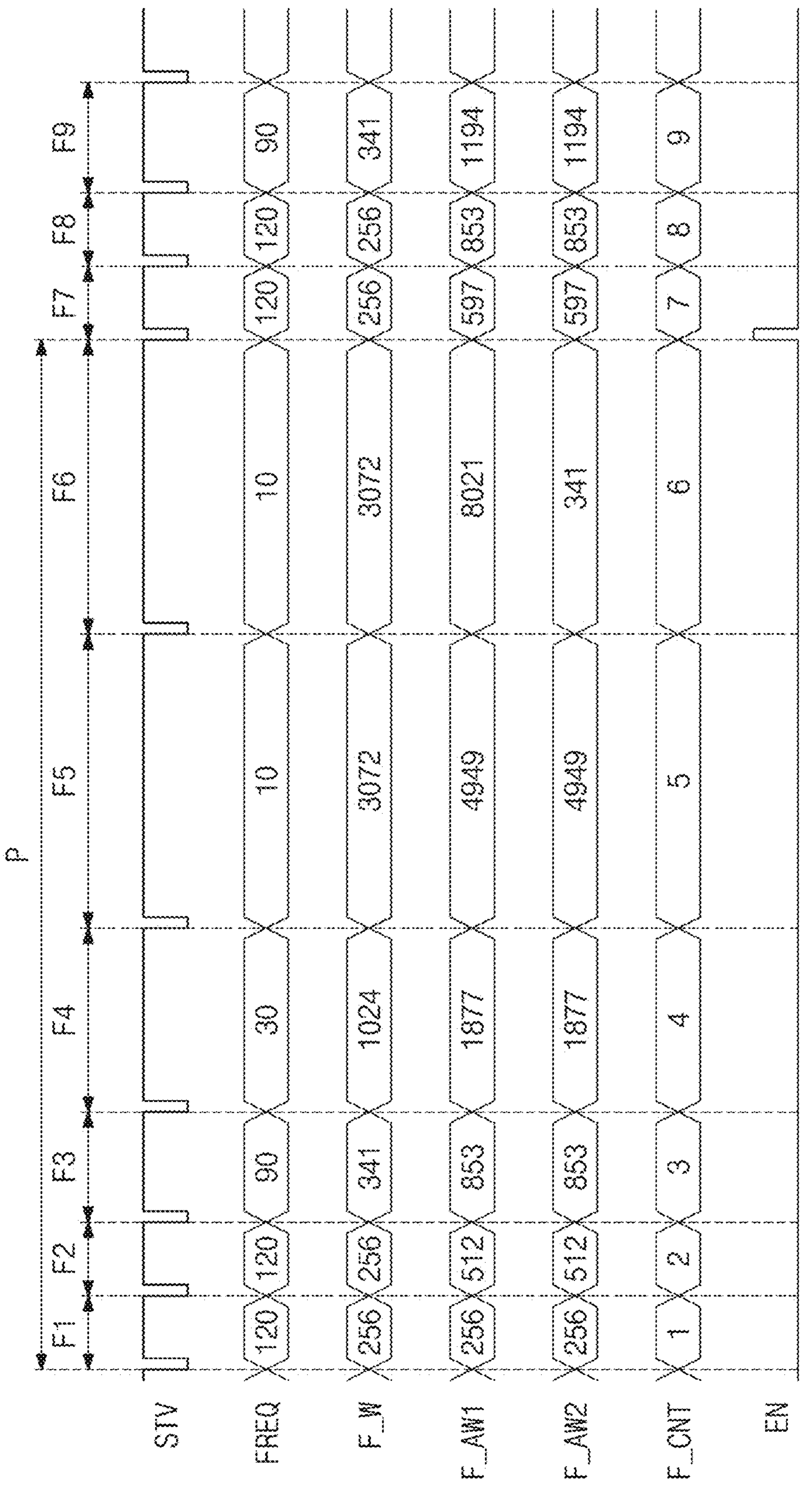
FIG. 9 is a diagram for describing an operation of an embodiment of a driving controller, according to the disclosure.

FIG. 9 is a diagram for describing an embodiment of an operation of a driving controller, according to the disclosure.

Referring to FIGS. 6 and 9, the operating time calculator 140 receives the current operating frequency FREQ. In an embodiment, an operating frequency included in the current operating frequency FREQ may be a value between about 1 Hz and about 120 Hz. That is, the maximum operating frequency H_F may be about 120 Hz, and the minimum operating frequency may be about 1 Hz.

In the embodiment shown in FIG. 9, during first to ninth frames F1 to F9, the current operating frequency FREQ may be sequentially changed to about 120 Hz, about 120 Hz, about 90 Hz, about 30 Hz, about 10 Hz, about 10 Hz, about 120 Hz, about 120 Hz, and about 90 Hz.

The operating time calculator 140 calculates a frame weight F_W for a current frame based on the current operating frequency FREQ. The current operating frequency FREQ includes an operating frequency for the current frame, that is, the current operating frequency FREQ. T The operating time calculator 140 may calculate the frame weight F_W according to Equation 1 based on a ratio of the maximum operating frequency H_F to the current operating frequency FREQ.

$$F\_W = \frac{H\_F}{FREQ} \times 256 \quad \text{[Equation 1]}$$

In an embodiment, when the maximum operating frequency H_F is about 120 Hz and the current operating frequency FREQ is about 1 Hz, the frame weight F_W is 30720, for example.

In an embodiment, when the maximum operating frequency H_F is about 120 Hz and the current operating frequency FREQ is about 120 Hz, the frame weight F_W is 256, for example.

Table 1 below shows the frame weight F_W according to the current operating frequency FREQ when the maximum operating frequency H_F is about 120

TABLE 1

| FREQ | 120 | 119 | 90 | 30 | 10 | 1 |
|---|---|---|---|---|---|---|
| F_W | 256 | 248 | 341 | 1024 | 3072 | 30720 |

The operating time calculator 140 calculates a first accumulated frame weight F_AW1 by accumulating the frame weight F_W for each frame.

$$F\_AW1=F\_AW2+F\_W \quad \text{[Equation 2]}$$

In an embodiment, when the current operating frequency FREQ in the first frame F1 is about 120 Hz and the current operating frequency FREQ in the second frame F2 is about 120 Hz, the first accumulated frame weight F_AW1 in the second frame F2 is "256+256=512", for example.

Moreover, when the current operating frequency FREQ is about 90 Hz in the third frame F3, the first accumulated frame weight F_AW1 in the third frame F3 is "512+341=853".

When the first accumulated frame weight F_AW1 is less than an update reference value (e.g., 7680), the second accumulated frame weight F_AW2 may have the same value as the first accumulated frame weight F_AW1 (F_AW2=F_AW1).

When the first accumulated frame weight F_AW1 in the sixth frame F6 is greater than the update reference value, the enable signal EN transitions from a low level to a high level. The update reference value may be a value corresponding to about 4 Hz, e.g., 7680, for example.

The stress converter 120 converts the output image signal O_RGB into current stress Str(t) in response to the enable signal EN of a high level.

The accumulation stress calculator 130 calculates the second accumulated stress AStr(t) by adding the first accumulated stress AStr(t−1) stored in the memory 150 and the current stress Str(t) from the stress converter 120 in response to the enable signal EN of a high level. The second accumulated stress AStr(t) may be calculated according to Equation 3.

$$AStr(t)=AStr(t-1)+Str(t) \quad \text{[Equation 3]}$$

The second accumulated stress AStr(t) may be stored in the memory 150.

When the first accumulated frame weight F_AW1 in the sixth frame F6 is greater than the update reference value, the operating time calculator 140 sets a difference between the first accumulated frame weight F_AW1 and the update reference value to the second accumulated frame weight F_AW2.

That is, when the first accumulated frame weight F_AW1 is greater than or equal to an update reference value U_REF, the operating time calculator 140 may calculate the second accumulated frame weight F_AW2 according to Equation 4.

$$F\_AW2=F\_AW1-U\_REF \quad \text{[Equation 4]}$$

In an embodiment, when the first accumulated frame weight F_AW1 in the sixth frame F6 is 8021 (i.e., 8021>7680), the second accumulated frame weight F_AW2 is "8021-7680=341", for example.

After the enable signal EN transitions to a high level, the first accumulated frame weight F_AW1 is changed to a difference value between the second accumulated frame weight F_AW2 and the update reference value U_REF. That is, when the first accumulated frame weight F_AW1 is greater than or equal to the update reference value U_REF, the first accumulated frame weight F_AW1 may be calculated according to Equation 5.

$$F\_AW1=F\_AW2-U\_REF \quad \text{[Equation 5]}$$

In an embodiment, when the first accumulated frame weight F_AW1 in the sixth frame F6 is 8021 (i.e., 8021>7680), the first accumulated frame weight F_AW1 after the enable signal EN transitions to a high level is "8021-7680=341", for example.

When the current operating frequency FREQ is about 120 Hz in the seventh frame F7, the frame weight F_W is 256. The first accumulated frame weight F_AW1 becomes "341+256=597" according to Equation 2.

When the first accumulated frame weight F_AW1 is greater than the update reference value U_REF in a variable frequency mode where the current operating frequency FREQ is variable, the operating time calculator 140 activates the enable signal EN to be at a high level such that the stress converter 120 and the accumulation stress calculator 130 calculate the second accumulated stress AStr(t).

When the enable signal EN transitions to a high level, the compensator 110 may receive a new first accumulated stress AStr(t−1) from the memory 150. That is, the compensator 110 may update the first accumulated stress AStr(t−1) to a new value in response to the enable signal EN.

In the embodiment shown in FIG. 9, the first to sixth frames F1 to F6 may correspond to a period P. In an embodiment, the period P may be a time (0.25 seconds) corresponding to about 4 Hz, for example. When the seventh frame F7 starts, the stress converter 120 and the accumulation stress calculator 130 may calculate the second accumulated stress AStr(t), and the compensator 110 may convert the input image signal I_RGB to the output image signal O_RGB based on the new first accumulated stress AStr(t−1).

Whenever the enable signal EN is activated, a variable 't' of each of the current stress Str(t), the first accumulated stress AStr(t−1), and the second accumulated stress AStr(t) may be increased by 1.

In an embodiment, as shown in FIG. 7, when the compensator 110 calculates the compensation value by the 4×4 pixels PX as one block, the stress converter 120 may calculate the current stress Str(t) in a unit corresponding to the 4×4 pixels PX among the output image signal O_RGB. In an embodiment, the average value for the 4×4 output image signals O_RGB is calculated, and the current stress Str(t) corresponding to the average value is calculated, for example.

In an embodiment, only when the enable signal EN is activated to a high level, the stress converter 120 and the accumulation stress calculator 130 operate. Accordingly, power consumption of the driving controller 100 may be minimized.

In an embodiment, the driving controller 100 may include a counter. The counter may perform a count operation in synchronization with the start signal STV. When the display device DD operates in a single frequency mode, the compensator 110, the stress converter 120, and the accumulation stress calculator 130 may operate when a count value F_CNT of the counter reaches a predetermined value.

In an embodiment, assuming that the current operating frequency FREQ in the single frequency mode is about 120 Hz, when the count value of counter F_CNT is 15, the compensator 110 may receive the first accumulated stress AStr(t−1), which is new, from the memory 150 and the stress converter 120 and the accumulation stress calculator 130 may calculate the second accumulated stress AStr(t), for example.

In a case of a multi-frequency mode, the current operating frequency FREQ may be different for every frame. In the embodiment shown in FIG. 9, the enable signal EN may transition to a high level at the period P. The enable signal EN in the seventh frame F7 transitions to a high level, but the count value of counter F_CNT is only 7.

As described above, in a variable frequency mode as well as a single frequency mode, the driving controller 100 may periodically calculate the second accumulated stress AStr(t) and may convert the input image signal I_RGB into the output image signal O_RGB based on the first accumulated stress AStr(t−1) that is the previous accumulated stress.

When the current operating frequency FREQ is about 1 Hz, the frame weight F_W calculated according to Equation 1 is 30720.

In an embodiment, assuming that the current operating frequency FREQ in the sixth frame F6 shown in FIG. 9 is about 1 Hz, when the second accumulated frame weight F_AW2 is calculated according to Equation 4, the second accumulated frame weight F_AW2 becomes "4949+30720=35669". When the second accumulated frame weight F_AW2 is calculated according to Equation 4, the second accumulated frame weight F_AW2 becomes "35669−7680=27989", for example. That is, a difference value between the first accumulated frame weight F_AW1 and the update reference value U_REF is greater than the update reference value U_REF. When the current operating frequency FREQ is about 1 Hz, the period of one frame is 1 second. The reason is that a value corresponding to 1 second is greater than a value of 7680 (0.25 seconds) corresponding to the update reference period P.

Accordingly, when the current operating frequency FREQ is lower than a frequency (e.g., about 4 Hz) corresponding to the update reference value U_REF, the operating time calculator 140 may calculate the second accumulated frame weight F_AW2 according to Equation 6.

$$F\_AW2=F\_AW1-(U\_REF\times(U\_REFQ/FREQ)) \quad \text{[Equation 6]}$$

U_REFQ denotes a frequency corresponding to the update reference value U_REF.

In an embodiment, when, in the sixth frame F6, the current operating frequency FREQ is about 1 Hz, the first accumulated frame weight F_AW1 is 35669, and U_REF is 7680, the second accumulated frame weight F_AW2 is "35669−(7680×4)=4949", for example.

When the current operating frequency FREQ is lower than the frequency (e.g., about 4 Hz) corresponding to the update reference value U_REF, the second accumulated stress AStr(t) may be calculated according to Equation 7.

$$\mathrm{AStr}(t)=\mathrm{AStr}(t-1)+\mathrm{Str}(t)\times W \quad \text{[Equation 7]}$$

Here, W is a weight.

When the current operating frequency FREQ is lower than about 4 Hz, the gate-source voltage of the first transistor T1 in the pixel PXij shown in FIG. 2 is maintained at the same voltage level for a long time. This increases the stress of the first transistor T1. Accordingly, it is appropriate to increase the second accumulated stress AStr(t) by a predetermined value when the current operating frequency FREQ is lower than about 4 Hz.

In this specification, it has been described that the update reference value U_REF corresponds to about 4 Hz in a variable frequency mode, but the disclosure is not limited thereto. In an embodiment, the update reference value U_REF may be set as a frequency lower than the frequency in the single frequency mode.

Figure 10:
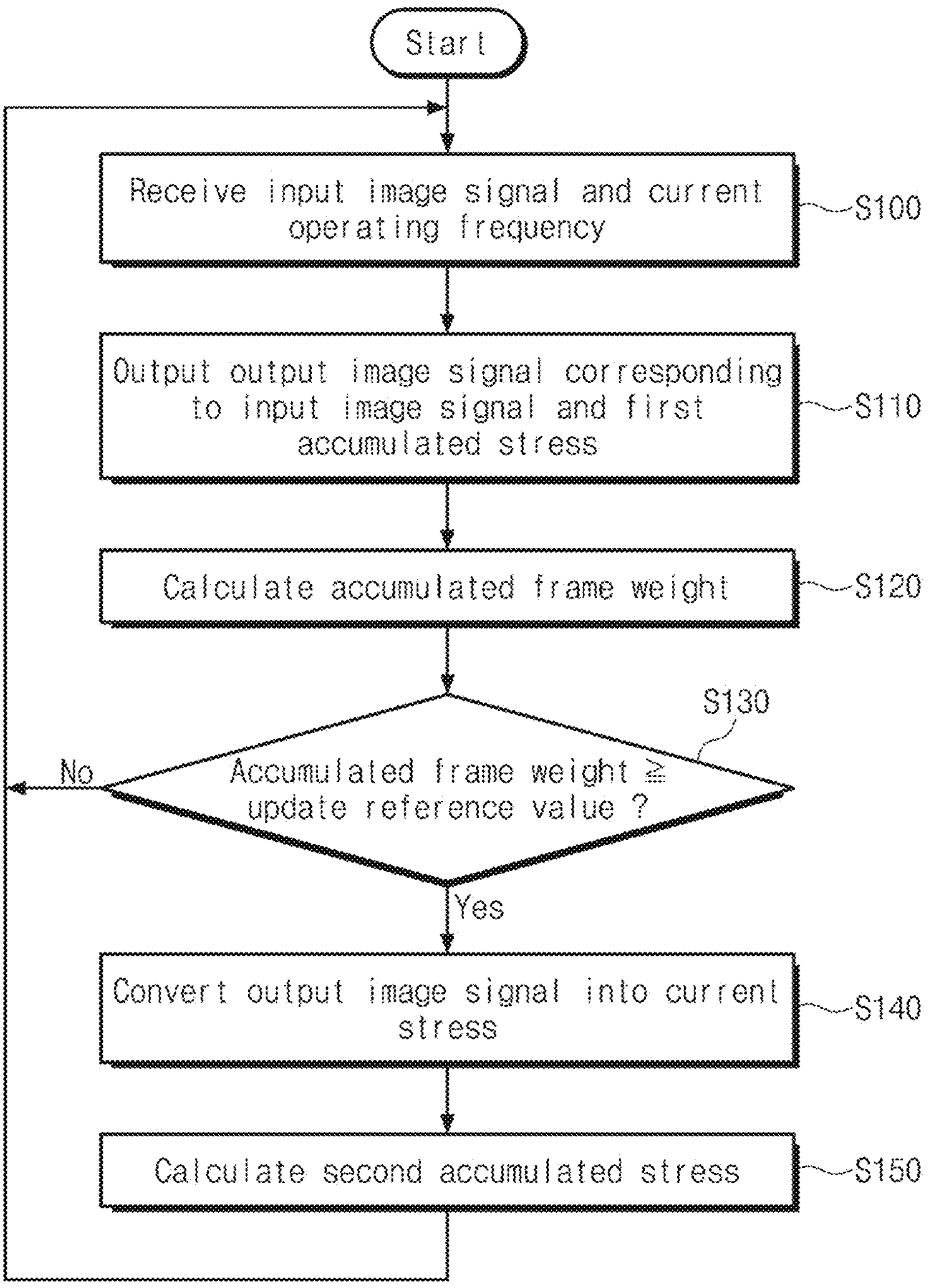
FIG. 10 is a flowchart of an operation method of a display device.

FIG. 10 is a flowchart of an operation method of a display device.

For convenience of description, an operating method of a display device will be described with reference to the display device DD of FIG. 1 and the driving controller 100 of FIG. 6, but the disclosure is not limited thereto.

Referring to FIGS. 1, 6, and 10, the compensator 110 in the driving controller 100 of the display device DD receives the input image signal I_RGB, and the operating time calculator 140 receives the current operating frequency FREQ (operation S100).

The compensator 110 outputs the output image signal O_RGB based on the input image signal I_RGB and the first accumulated stress AStr(t−1) (operation Silo).

The operating time calculator 140 calculates the first accumulated frame weight F_AW1 based on the current operating frequency FREQ (operation S120). The first accumulated frame weight F_AW1 may be calculated according to Equation 1.

When the first accumulated frame weight F_AW1 is greater than or equal to an update reference value (operation S130: Yes), the operating time calculator 140 may output the enable signal EN of an active level (e.g., a high level).

When the enable signal EN is activated because the first accumulated frame weight F_AW1 is greater than or equal to the update reference value, the stress converter 120 converts the output image signal O_RGB into the current stress Str(t) (operation S140).

When the enable signal EN is activated because the first accumulated frame weight F_AW1 is greater than or equal to the update reference value, the accumulation stress calculator 130 calculates the second accumulated stress AStr(t) by adding the first accumulated stress AStr(t−1) stored in the memory 150 and the current stress Str(t) from the stress converter 120 (operation S150). The second accumulated stress AStr(t) may be stored in the memory 150. The second accumulated stress AStr(t) stored in the memory 150 may be provided to the compensator 110 when the next enable signal EN is activated.

When the first accumulated frame weight F_AW1 is less than an update reference value (operation S130: No), operation S100 may be repeated.

Although an embodiment of the disclosure has been described for illustrative purposes, those skilled in the art will appreciate that various modifications, and substitutions are possible, without departing from the scope and spirit of the disclosure as disclosed in the accompanying claims.

Accordingly, the technical scope of the disclosure is not limited to the detailed description of this specification, but should be defined by the claims.

A driving controller of a display device having such a configuration may accumulate the stress of a transistor in a pixel, may calculate a compensation value corresponding to the accumulated stress, and may output an output image signal obtained by compensating for an input image signal. In detail, in a variable frequency mode in which a frequency of an input image signal is changed, the stress of a transistor may be accumulated at regular intervals, and thus a driving controller may calculate a precise compensation value.

Accordingly, even when the frequency of the input image signal is changed, it is possible to prevent deterioration of image quality due to a change in characteristics of transistors in a pixel.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A driving controller comprising:

a compensator which receives an input image signal, calculates a compensation value based on first accumulated stress, and outputs an output image signal by compensating for the input image signal with the compensation value;

a stress converter which converts the output image signal into current stress in response to an enable signal;

an accumulation stress calculator which outputs second accumulated stress by adding the first accumulated stress and the current stress in response to the enable signal;

a memory which stores the second accumulated stress and provides the first accumulated stress to the compensator and the accumulation stress calculator; and an operating time calculator which receives a current operating frequency and outputs the enable signal of an active level based on the current operating frequency.

2. The driving controller of claim 1, wherein the operating time calculator calculates a frame weight corresponding to a ratio of a maximum operating frequency of the current operating frequency to the current operating frequency, calculates a first accumulated frame weight obtained by accumulating the frame weight at each frame, and outputs the enable signal of the active level when the first accumulated frame weight is greater than or equal to an update reference value.

3. The driving controller of claim 2, wherein, when the first accumulated frame weight is greater than or equal to the update reference value, the operating time calculator outputs a difference between the first accumulated frame weight and the update reference value as a second accumulated frame weight.

4. The driving controller of claim 3, wherein, when the enable signal is at the active level, the operating time calculator outputs a sum of the second accumulated frame weight and the frame weight as the first accumulated frame weight.

5. The driving controller of claim 4, wherein, when the first accumulated frame weight is less than the update reference value, the operating time calculator outputs the first accumulated frame weight as the second accumulated frame weight.

6. The driving controller of claim 2, wherein, when the first accumulated frame weight is less than the update reference value, the operating time calculator outputs the enable signal of an inactive level.

7. The driving controller of claim 6, wherein, when the enable signal is at the inactive level, the stress converter and the accumulation stress calculator are inactive.

8. The driving controller of claim 3, wherein, when the current operating frequency is lower than a frequency corresponding to the update reference value, the operating time calculator calculates the second accumulated frame weight according to Equation:

$$F\_AW2=F\_AW1-(U\_REF\times(U\_FREQ/FREQ)),$$ and wherein F_AW2 denotes the second accumulated frame weight, F_AW1 denotes the first accumulated frame weight, U_REF denotes the update reference value, U_REF denotes a frequency corresponding to the update reference value, and FREQ denotes the current operating frequency.

9. The driving controller of claim 2, wherein, when the current operating frequency is lower than a frequency corresponding to the update reference value, the accumulation stress calculator calculates the second accumulated stress according to Equation:

$$AStr(t)=AStr(t-1)+Str(t)\times W,$$ and wherein AStr(t) denotes the second accumulated stress, AStr(t−1) denotes the first accumulated stress, Str(t) denotes the current stress, and W denotes a weight.

10. The driving controller of claim 1, wherein, when the enable signal is at the active level, the compensator receives the first accumulated stress, which is new, from the memory.

11. A display device comprising:

a display panel including a pixel; and a driving controller which:

receives an input image signal;

calculates a compensation value based on accumulated stress; and provides the display panel with an output image signal obtained by compensating for the input image signal with the compensation value, wherein the driving controller accumulates a frame weight based on a current operating frequency in a variable frequency mode and calculates the accumulated stress again based on the output image signal when an accumulated frame weight is greater than or equal to an update reference value.

12. The display device of claim 11, wherein the driving controller includes:

a compensator which calculates the compensation value based on first accumulated stress, and to output the output image signal obtain by compensating for the input image signal with the compensation value;

a stress converter which converts the output image signal into current stress in response to an enable signal;

an accumulation stress calculator which outputs second accumulated stress obtained by adding the first accumulated stress and the current stress in response to the enable signal;

a memory which stores the second accumulated stress and to provide the first accumulated stress to the compensator and the accumulation stress calculator; and an operating time calculator which calculates the accumulated frame weight based on the current operating frequency and to output the enable signal of an active level when the accumulated frame weight is greater than or equal to the update reference value.

13. The display device of claim 12, wherein the operating time calculator calculates a frame weight corresponding to a ratio of a maximum operating frequency of the current operating frequency to the current operating frequency, calculates a first accumulated frame weight obtained by accumulating the frame weight at each frame, and outputs the enable signal of the active level when the first accumulated frame weight is greater than or equal to the update reference value.

14. The display device of claim 13, wherein, when the first accumulated frame weight is greater than or equal to the update reference value, the operating time calculator outputs a difference between the first accumulated frame weight and the update reference value as a second accumulated frame weight.

15. The display device of claim 14, wherein, when the enable signal is at the active level, the operating time calculator outputs a sum of the second accumulated frame weight and the frame weight as the first accumulated frame weight.

16. The display device of claim 13, wherein, when the first accumulated frame weight is less than the update reference value, the operating time calculator outputs the first accumulated frame weight as a second accumulated frame weight.

17. The display device of claim 13, wherein, when the first accumulated frame weight is less than the update reference value, the operating time calculator outputs the enable signal of an inactive level.

18. The display device of claim 17, wherein, when the enable signal is at the inactive level, the stress converter and the accumulation stress calculator are inactive.

19. The display device of claim 11, wherein the pixel includes:

a light-emitting element; and a first transistor electrically connected to the light-emitting element and which provides the light-emitting element with a current corresponding to the output image signal, wherein the compensation value is a value for compensating for deterioration characteristics of the first transistor.

20. An operating method of a display device, the method comprising:

receiving an input image signal and a current operating frequency;

outputting an output image signal based on the input image signal and first accumulated stress;

calculating a first accumulated frame weight based on the current operating frequency;

when the first accumulated frame weight is greater than or equal to an update reference value, outputting an enable signal of an active level;

when the enable signal is at the active level, converting the output image signal into current stress; and when the enable signal is at the active level, calculating second accumulated stress based on the first accumulated stress and the current stress and storing the second accumulated stress in a memory, wherein the second accumulated stress stored in the memory is provided as the first accumulated stress.

21. The method of claim 20, wherein the outputting the enable signal of the active level includes:

calculating a frame weight corresponding to a ratio of a maximum operating frequency of the current operating frequency to the current operating frequency;

calculating the first accumulated frame weight obtained by accumulating the frame weight at each frame; and outputting the enable signal of the active level when the first accumulated frame weight is greater than or equal to the update reference value.

22. The method of claim 21, wherein the outputting the enable signal of the active level includes:

when the first accumulated frame weight is greater than or equal to the update reference value, outputting a difference between the first accumulated frame weight and the update reference value as a second accumulated frame weight.

* * * * *